US012651080B2

(12) United States Patent
Dunjic et al.

(10) Patent No.: US 12,651,080 B2
(45) Date of Patent: Jun. 9, 2026

(54) SYSTEMS AND METHODS FOR CONTROLLING ACCESS TO SOFTWARE FEATURES

(71) Applicant: The Toronto-Dominion Bank, Toronto (CA)

(72) Inventors: Milos Dunjic, Oakville (CA); David Samuel Tax, Toronto (CA); Kushank Rastogi, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 441 days.

(21) Appl. No.: 17/701,760

(22) Filed: Mar. 23, 2022

(65) Prior Publication Data

US 2023/0315870 A1     Oct. 5, 2023

(51) Int. Cl.
 *G06F 21/60* (2013.01)
 *G06F 21/62* (2013.01)
(52) U.S. Cl.
 CPC ............ *G06F 21/604* (2013.01); *G06F 21/62* (2013.01); *G06F 2221/2141* (2013.01); *G06F 2221/2149* (2013.01)
(58) Field of Classification Search
 CPC .................... G06F 21/604; G06F 21/62; G06F 2221/2141; G06F 2221/2149
 USPC ......................................... 726/27
 See application file for complete search history.

(56) References Cited

U.S. PATENT DOCUMENTS

| | | | |
|---|---|---|---|
| 10,146,850 B2 * | 12/2018 | Eigner ................ | G06F 40/174 |
| 10,373,267 B2 | 8/2019 | Chang et al. | |
| 10,503,394 B2 | 12/2019 | Aggarwal et al. | |
| 10,679,286 B1 * | 6/2020 | Aruhan ................ | G06Q 40/03 |
| 11,838,410 B1 * | 12/2023 | Ramanathan ......... | H04L 9/0825 |
| 2015/0161609 A1 * | 6/2015 | Christner ........... | G06Q 20/4016 |
| | | | 705/44 |
| 2018/0040064 A1 | 2/2018 | Grigg et al. | |
| 2018/0096434 A1 | 4/2018 | Aggarwal et al. | |
| 2019/0378207 A1 | 12/2019 | Dibner-Dunlap et al. | |
| 2020/0074565 A1 | 3/2020 | Dotter | |
| 2021/0173711 A1 * | 6/2021 | Crabtree ............. | G06F 16/9024 |
| 2021/0342321 A1 * | 11/2021 | Jacob Sushil ....... | G06F 16/1734 |
| 2021/0397696 A1 * | 12/2021 | Yarabolu .............. | G06F 21/554 |

* cited by examiner

*Primary Examiner* — Hany S. Gadalla
(74) *Attorney, Agent, or Firm* — Peter Eschlboeck; Rowand LLP

(57)     ABSTRACT

Methods and computer systems for controlling access to software features in a computing environment. Obtaining a plurality of electronic documents associated with an account, each particular electronic document in the plurality of electronic documents including a respective first data item in a first field and a respective second data item in a second field. Categorizing each respective first data item based on the corresponding respective second data item. Applying a scoring model to the respective first data items included in the plurality of electronic documents according to the categorizations to create a score. Unlocking a software feature associated with the account in response to determining that the score meets a threshold.

20 Claims, 7 Drawing Sheets

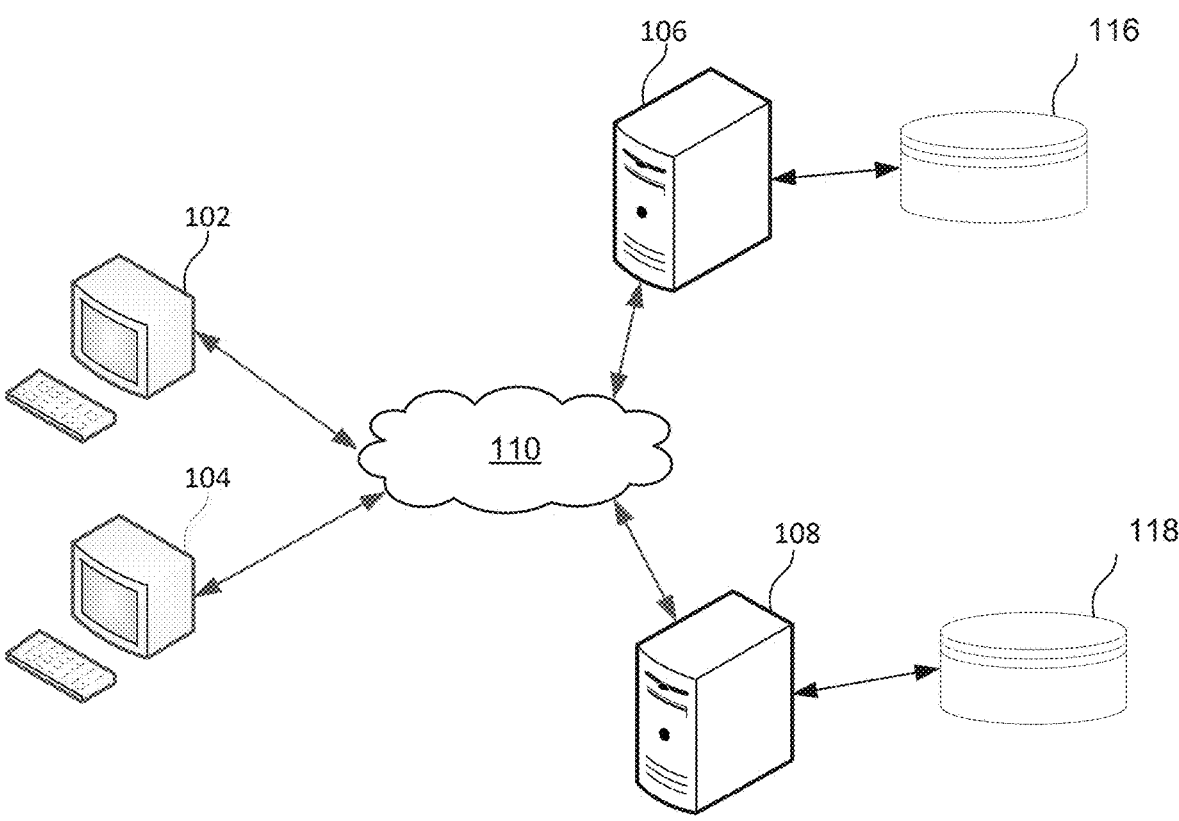
FIG. 1

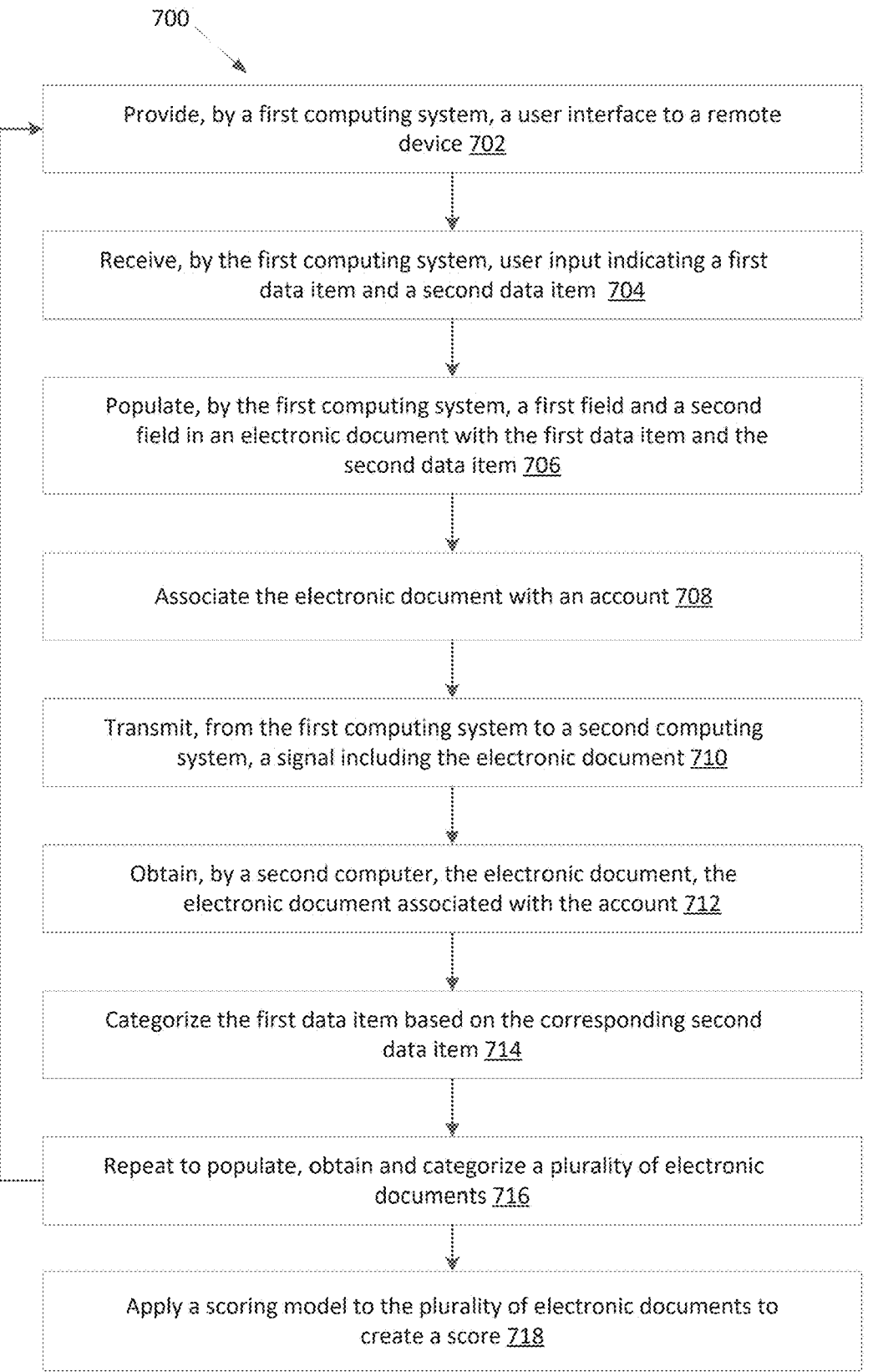

700

Provide, by a first computing system, a user interface to a remote device 702

Receive, by the first computing system, user input indicating a first data item and a second data item 704

Populate, by the first computing system, a first field and a second field in an electronic document with the first data item and the second data item 706

Associate the electronic document with an account 708

Transmit, from the first computing system to a second computing system, a signal including the electronic document 710

Obtain, by a second computer, the electronic document, the electronic document associated with the account 712

Categorize the first data item based on the corresponding second data item 714

Repeat to populate, obtain and categorize a plurality of electronic documents 716

Apply a scoring model to the plurality of electronic documents to create a score 718

FIG. 7

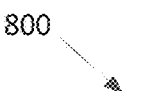
800

Obtain an electronic document associated with an account, the electronic document including a third data item in a first field and a second data item in a second field 802

In response to obtaining the electronic document, categorize a first data item Included in the electronic document based on asecond data item included in the electronic document 804

Determine an adjusted score based on the categorization of the first data item and the contents of the electronic document
806

Determine a score
902

Determine score trend
904

906

Condition satisfied?

Yes

No

908

Already locked?

Yes

No

914

Already locked?

Yes

No

Unlock a software feature associated with the account 910

Renew unlock
912

Renew lock
918

Lock a software feature associated with the account 916

Generate a notification
920

SYSTEMS AND METHODS FOR CONTROLLING ACCESS TO SOFTWARE FEATURES

FIELD

The present disclosure relates to lockable software features and, more particularly, to systems and methods for controlling access to lockable software features associated with an account.

BACKGROUND

Software-locked features exist in numerous technologies. The unlocking of these features may occur in a variety of ways. For example, the automotive industry uses in-car purchases to unlock software features. By way of another example, the gaming industry uses gameplay to unlock new parts of a game, for example, to gain access to a new level.

It would be advantageous to provide for enhanced control of access to software features.

BRIEF DESCRIPTION OF THE DRAWINGS

Reference will now be made, by way of example, to the accompanying drawings which show example embodiments of the present application, and in which:

FIG. 1 shows a schematic diagram illustrating an operating environment of an example embodiment according to the subject matter of the present application;

FIG. 7 is a flowchart showing operations performed in creating a score, according to an example embodiment;

FIG. 8 is another flowchart showing operations performed in adjusting a score, according to an example embodiment.

Similar reference numerals may have been used in different figures to denote similar components.

DETAILED DESCRIPTION OF EXAMPLE EMBODIMENTS

Figure 2:
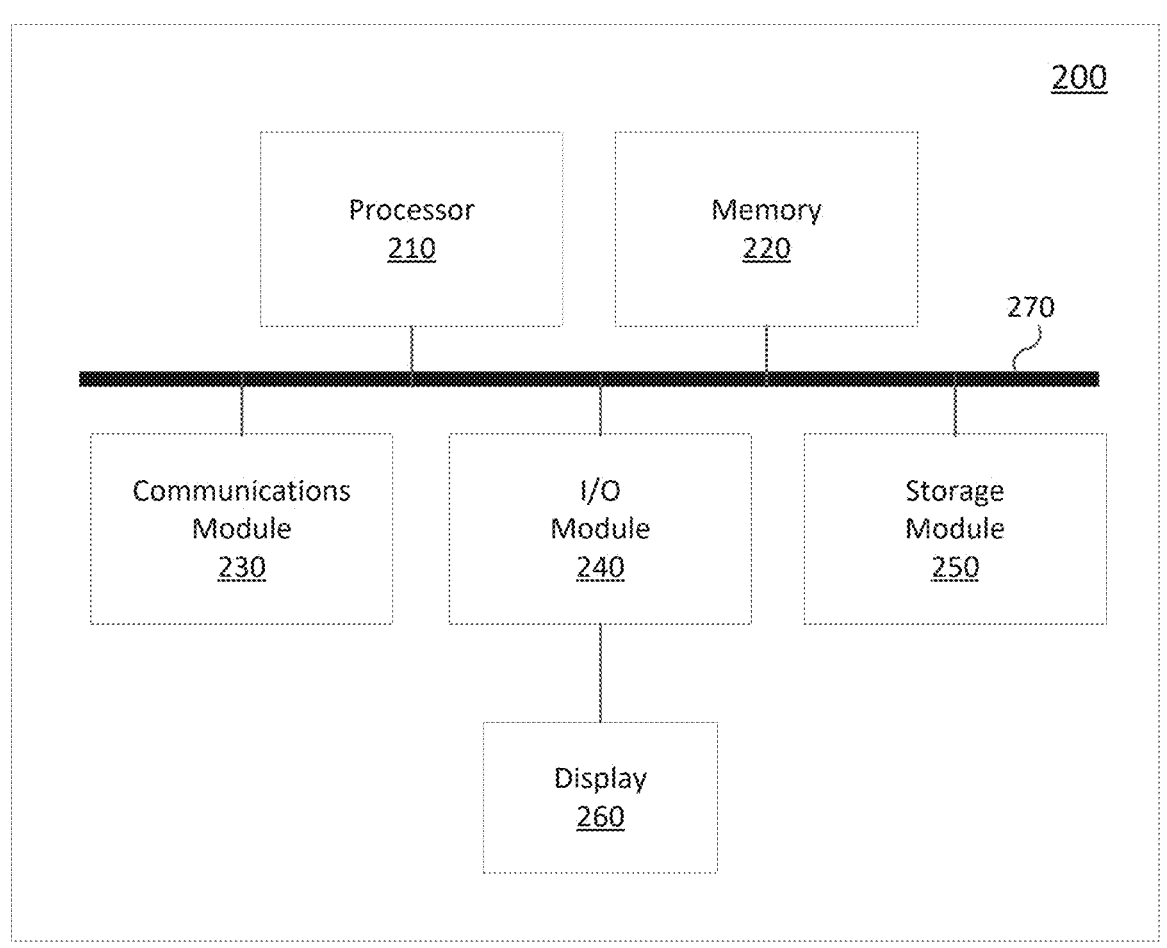
FIG. 2 shows a high-level schematic diagram of the remote device of FIG. 1.

In one embodiment, the present application describes a computer system. The computer system may include a communications module; a processor coupled to the communications module; and a memory coupled to the processor. The memory may store instructions that, when executed by the computer system, cause the computer system to: obtain a plurality of electronic documents associated with an account, each particular electronic document in the plurality of electronic documents including a respective first data item in a first field and a respective second data item in a second field; categorize each respective first data item based on the corresponding respective second data item; apply a scoring model to the respective first data items included in the plurality of electronic documents according to the categorizations to create a score; and unlock a software feature associated with the account in response to determining that the score meets a threshold.

In some implementations, wherein unlocking the software feature may include enabling a software service or product associated with the account.

In some implementations, wherein unlocking the software feature may include providing access to a resource associated with the account.

In some implementations, wherein unlocking the software feature may include configuring a parameter associated with the account.

In some implementations, the plurality of electronic documents represent metadata associated with a plurality of transfer messages.

In some implementations, the instructions may further cause the computer system to re-determine the score in response to completing each particular transfer in a plurality of transfers.

In some implementations, the instructions may further cause the computer system to detect a deterioration in the score based on metadata included in a transfer message.

In some implementations, the categorizations include a plurality of categories.

In some implementations, the categorizations represent types of transfer messages.

In some implementations, each respective first data item represents an amount of resources to be transferred.

In some implementations, the respective first data items included in the plurality of electronic documents include a numeric value.

In some implementations, the instructions may further cause the computer system to, in response to obtaining an additional electronic document, determine an adjusted score based on the contents of the additional electronic document.

In some implementations, the instructions may further cause the computer system to automatically lock the unlocked software feature associated with the account in response to determining that the adjusted score does not meet the threshold.

In some implementations, the instructions may further cause the computer system to leave the software feature unlocked in response to determining that the adjusted score meets the threshold.

In some implementations, the instructions may further cause the computer system to categorize a third data item included in the additional electronic document and determine the adjusted score in response to determining that the categorization of the third data item matches a defined category.

In another aspect, present application describes a method for controlling access to software features in a computing environment. The method may include obtaining a plurality of electronic documents associated with an account, each particular electronic document in the plurality of electronic documents including a respective first data item in a first field and a respective second data item in a second field, categorizing each respective first data item based on the corresponding respective second data item, applying a scoring model to the respective first data items included in the plurality of electronic documents according to the categorizations to create a score, and unlocking a software feature associated with the account in response to determining that the score meets a threshold.

In some embodiments, unlocking the software feature may include enabling a software service or product associated with the account.

In some embodiments, the plurality of electronic documents represent metadata associated with a plurality of transfer messages In some embodiments, each respective first data item represents an amount of resources to be transferred.

In yet another aspect, present application describes a non-transitory computer-readable storage medium comprising processor-executable instructions which, when executed, configure a processor to: obtain a plurality of electronic documents associated with an account, each particular electronic document in the plurality of electronic documents including a respective first data item in a first field and a respective second data item in a second field, categorize each respective first data item based on the corresponding respective second data item, apply a scoring model to the respective first data items included in the plurality of electronic documents according to the categorizations to create a score, and unlock a software feature associated with the account in response to determining that the score meets a threshold.

In yet a further aspect, the present application describes a non-transitory computer-readable storage medium storing processor-readable instructions that, when executed, configure a processor to perform any of the methods described herein. Also described in the present application is a computing device comprising: a processor, memory, and an application containing processor-executable instructions that, when executed, cause the processor to carry out at least one of the methods described herein. In this respect, the term processor is intended to include all types of processing circuits or chips capable of executing program instructions.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any subcombination, or all of the elements, without necessarily excluding any additional elements, and without necessarily requiring all of the elements.

The present application makes reference to a "request to transfer", which may be a specially formatted message that is sent from a first database management system to a second database management system. The request to transfer may be sent from the first database management system to the second database management system over a transfer rail that is used for facilitating transfers between databases associated with different database management systems. For example, the first database management system may be associated with a first database and the second database management system may be associated with a second database. The databases may store account data. That is, the databases may store data that is associated with various accounts. In at least some implementations, each record in the database may be associated with a particular one of these accounts.

A request to transfer is a message that is sent on behalf of a recipient to initiate a transfer from a sender to the recipient.

That is, the request to transfer is sent, on behalf of the recipient, from the database management system associated with the recipient to the database management system associated with the sender. The request to transfer requests a transfer from a record in the database that is associated with the sender to a record in the database that is associated with the recipient. The request to transfer includes one or more identifiers that identify the record associated with the sender and/or the record associated with the recipient. The identifier(s) may be or include an account number. The request to transfer may also include one or more identifiers that identify the database management system associated with the sender and/or that identify the database management system associated with the recipient. Such identifiers may be or include one or more of: a transit number and an institution number.

The request to transfer is a transfer initiation message. That is, the request to transfer is an initial message that may be used to cause a transfer to occur. Since the request to transfer is initiated by a recipient rather than a sender, the request to transfer may be considered to a pull-style transfer, which may be contrasted with typical push-style transfers. In at least some implementations, the request to transfer may be formatted as an ISO20022 message.

The request to transfer message is specially formatted to include parameters of a transfer that is requested to be made from a sender. The parameters may be included as metadata in the transfer message. Where the request to transfer is an ISO20022 message, the parameters may be included in an ISO20022 format. The parameters may include resource definition data. The resource definition data defines what is requested to be transferred. By way of example, the resource definition data may define a resource that is stored in or otherwise associated with a record associated with the sender. The resource may be, for example, a computing resource. In another implementation, the resource may be data. In some implementations, the resource may represent an amount of value, such as a quantity of a currency.

The parameters that are included in the request to transfer may include data of another type. For example, in some implementations, the parameters may be or include transfer scheduling data. The transfer scheduling data may represent a time when the requested transfer is to be made. This time may be, for example, a due date or deadline. The due date or deadline represents a latest time at which the transfer is to be made.

The request to transfer message may, in some implementations, be or represent a request for payment. Such a message may be referred to as a request for payment (RFP) message or a request to pay (RTP) message. In such implementations, the transfer rail may be a payment rail such as a real time payment rail and the database management systems may be a financial institution systems. In at least some such implementations, the records may represent bank accounts and a transfer may be a request to transfer value from a sender bank account to the recipient bank account. The request to transfer message may be sent from a first financial institution system, which is associated with a first financial institution, to a second financial institution system, which is associated with a second financial institution.

The request to transfer message is a special transfer message which is not formatted as an email or short message service (SMS) message. Rather, it is a computer-to-computer message that is formatted to be specially processed by the database management system that receives it. For example, the database management system that receives the request to transfer message may be configured to execute a process for obtaining authorization to complete a transfer in response to receiving the request to transfer. More particularly, the database management systems may be configured to only permit authorized transfers. For example, in one implementation, the database stores account data for a plurality of accounts and a database management system will only allow a transfer out of an account if the transfer is authorized by an authorization entity for that account, such as an account holder. Authorization may, for example, require authenticated approval using a credential such as one or more of a username, password, biometric authentication data or other credential.

In one implementation, in response to receiving the transfer message, a database management system may identify an affected account using an identifier defined by the transfer message. Then, the database management system may send an electronic notification to a client device associated with the identified account. This notification may be provided as an in-application notification or operating system level notification. The notification may include a selectable option to authorize the transfer.

The notification may allow the transfer to be made without requiring input of one or more parameters that are typically required when a transfer is initiated by the sender rather than the recipient. By way of example, one or more parameters that are included in the request to transfer may be used to pre-stage or pre-populate parameters of the transfer so that the sender does not have to input such parameters. In some implementations, the resource definition data included in the request to transfer may be used to allow the transfer to be made without having the sender define what is to be transferred. For example, where the transfer is a transfer of a computing resource or data, the sender may perform the transfer without having to input any information defining the computing resource or data involved. Or, where the transfer is a transfer of an amount of value, the amount of value defined in the request for transfer message may be used so that the sender does not have to define the amount of value.

In some implementations, transfer scheduling data included in the request to transfer message may be used to schedule the transfer without requiring the sender to define such a schedule. For example, where the transfer scheduling data is a due date or deadline, the database management system associated with the sender may automatically define a time for a transfer based on the transfer scheduling data without requiring the sender to input such a time.

In this way, the sender may cause a database management system that is associated with the sender's record in a database to perform the transfer without having to input any parameters for the transfer.

The present application makes reference to a "transfer message", which is a computer-readable message configured for transmission over one or more computer networks between a sending device and a receiving device. The transfer message may be or include a request to transfer. The transfer message may be a structured message having a defined schema or set of predefined fields to contain data. The transfer message may be used to transfer resources from one entity to another entity. In particular, the transfer message may be used to effect a change in recorded ownership of resources. The resources may be currency, physical assets, credits, tokenized items like non-fungible tokens, computing resources such as memory allocated or processor time, access rights, or any other resource that may be owned or credited to an account associated with an account holder. In many of the examples below, monetary resources may be referenced to illustrate concepts, but the present application is not necessarily solely applicable to financial or monetary instruments or resources.

Many of the embodiments described herein focus on a transfer message that is provided as either a payment or request for payment. However, it is understood that the present application is not limited to any such embodiments and that the embodiments described with respect to a particular type of transfer generally may be extended to other types of transfers.

In the present application, the terms "transferor" and "transferee" may be used interchangeably with "sender" and "recipient", respectively, in the context of describing transfers of resources. In some cases, the terms "payor" or "payee" may be used in the example of monetary resources.

The present application further makes reference to an "electronic document", which may be any electronic media content, including a digital image, video, spreadsheet, plain text or extensible markup language (XML) document. An electronic document may include a plurality of data fields. For example, a digital image may include and be associated with metadata fields. Example metadata fields that may be associated with a digital image include a title, subject, date taken, software program name, image dimensions, file type, size and location, which may be a global positioning system (GPS location). As another example, an XML document may include a plurality of elements as well as a plurality of attributes, each of which may consist of a name-value pair. An element's content or the value in a name-value pair may sometimes be referred to as a data field. In some embodiments, the XML document may be formatted as an ISO20022 message.

FIG. 1 shows a schematic diagram illustrating an operating environment of an example embodiment. The operating environment in this example includes a first system 106, a second system 108, a first remote device 102 and a second remote device 104. In some embodiments, the operating environment may include one or more remote devices or a plurality of remote devices, which may include the first remote device 102 and/or the second remote device 104.

As illustrated, the first system 106 may provide a front-end interface which allows the remote devices 102 and 104 to interact with the first system 106. For example, the first system 106 may provide one or more graphical user interfaces (GUIs) to the remote devices 102 and 104. By way of example, the first system 106 may provide, to the remote devices 102 and 104, a user interface. The user interface provided to the remote devices 102 and 104 may be an interface for receiving user input indicating data to be used to populate one or more fields in an electronic document.

The first system 106 may be managed, operated, or controlled by an entity that may be an agent of a first account holder and may be a financial institution, such as a bank. The first account holder may be a customer (e.g. a corporate/business customer) or client of the entity or otherwise associated with the entity.

The first system 106 may store data regarding one or more electronic documents in a plurality of respective electronic document objects. The first system 106 may further store data regarding users or customers associated with the first system 106 in a plurality of respective user account objects representing respective user accounts.

The first system 106 may be used to transmit a message to a system associated with a second account holder, for example, the second system 108.

As illustrated, the first system 106 is in communication with the second system 108 via the network 110. The first system 106 may be configured to transmit to the second system 108 a message and an electronic document. The second system 108 may be further configured to receive a message and an electronic document from the first system 106.

The second system 108 may be managed, operated, or controlled by an entity that may be an agent of a second account holder and may be a financial institution, such as a bank. The second account holder may be a customer (e.g. a corporate/business customer) or client of the entity or otherwise associated with the entity.

The second system 108 may store data regarding one or more electronic documents in a plurality of respective electronic document objects. The second system 108 may further store data regarding users or customers associated with the second system 108 in a plurality of respective user account objects representing respective user accounts.

The first system 106 and the second system 108 may be configured to ingest data from each other and may transmit alerts, notifications, configuration objects, or other data to each other and/or the remote devices 102 and 104. More particularly, the first system 106 may include infrastructure configured to receive a message from the second system 108 and transmit a notification to the first remote device 102, the second remote device 104 and/or the second system 108 in response to receiving the message.

The first system 106 and the second system 108 may store data in respective data stores 116 and 118. The data stores 116 and 118 are illustrated as single units for ease of illustration, but may include a plurality of storage units and, in some cases, storage media connected via the network 110.

As illustrated, each of the remote devices 102 and 104 is in communication with a first system 106 via a network 110. One or more of the remote devices 102 and/or 104 may be managed, operated or controlled by the first account holder. The remote device 102 and/or 104 may be associated with an alias associated with the first account holder and a user account associated with the first account holder and the first system 106. The remote devices 102 and 104 may be engaged using the alias.

In some embodiments, each of the remote devices 102 and 104 may be managed, operated or controlled by respective account holders. Each particular remote device of the plurality of remote devices 102 and 104 may be associated with a respective alias associated with a respective account holder, a respective user account, and the first system 106. In other words, the plurality of remote devices may be engaged using separate aliases.

Each of the remote devices 102 and 104 may be used, for example, to receive user input that includes an indication of a data item to be included in an electronic document. The user input may further include an indication of a transfer amount, a category, routing data, intended transferor, recipient, an account associated with the intended transferor, an account associated with the recipient, and other information to be included in or used to populate one or more fields in an electronic document.

Each of the remote devices 102 and 104 is a computing device. It may, as illustrated, be a desktop computer. However, the remote devices 102 and 104 may be a computing device of another type such as, for example, a smart phone, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The first system 106 and second system 108 are or include a computer system such as a computer server system or a database management system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, web servers, email servers, file transfer protocol (FTP) servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The first remote device 102, second remote device 104, first system 106 and second system 108 may be in geographically disparate locations.

The network 110 is a computer network. The network 110 may be an internetwork such as may be formed of one or more interconnected computer networks. For example, such a network may be or may include an Ethernet network, an asynchronous transfer mode (ATM) network, a wireless network, or the like. In some implementations, the network 110 may be the Internet. The network 110 allows the first remote device 102, remote device 104, first system 106 and second system 108 to communicate with one another.

As further described below, the first remote device 102, second remote device 104, first system 106 and second system 108 may be configured with software to perform associated functions such as those described herein.

FIG. 1 illustrates the first system 106, second system 108, and data stores 116 and 118 as separate computing devices. However, these systems may not be separate physical systems. For example, the first system 106 and the data store 116 may be implemented on a common physical device. As another example, the second system 108 and the data store 118 may be implemented on a common physical device. As yet another example, the first system 106 and second system 108 may be implemented in software associated with a common processor. As yet a further example, the data stores 116 and 118 may be included in the first system 106 and second system 108, respectively, or may be external to those systems.

An example embodiment of the remote device 102 or 104 will now be discussed with reference to FIG. 2. FIG. 2 is a high-level schematic diagram of the remote device 100. The remote device 102 or 104 may, in some embodiments, be a personal computer as shown in FIG. 1.

The remote device 102 or 104 includes a variety of modules. For example, as illustrated, the example computing device 200 may include a processor 210, a memory 220, a communications module 230, an I/O module 240, and/or a storage module 250. As illustrated, the foregoing example modules of the example computing device 200 are in communication over a bus 270. As such, the bus 270 may be considered to couple the various modules of the remote device 102 or 104 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the remote device 102 or 104.

The communications module 230 allows the remote device 102 or 104 to communicate with other computing devices and/or various communications networks such as, for example, the network 110. For example, the communications module 230 may allow the remote device 102 or 104 to send or receive communications signals. Communications signals may be sent or received according to one or more protocols or according to one or more standards. The communications module 230 may allow the remote device 102 or 104 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 230 may allow the remote device 102 or 104 to communicate using near-field communication (NFC), via Wi-Fi™, using Bluetooth™ or via some combination of one or more networks or protocols. In some embodiments, all or a portion of the communications module 230 may be integrated into a component of the remote device 102 or 104. For example, the communications module 230 may be integrated into a communications chipset.

The I/O module 240 is an input/output module. The I/O module 240 allows the remote device 102 or 104 to receive input from and/or to provide input to components of the remote device 102 or 104 such as, for example, various input modules and output modules. For example, the I/O module 240 may, as shown, allow the remote device 102 or 104 to receive input from and/or provide output to the display 260.

The storage module 250 allows data to be stored and retrieved. In some embodiments, the storage module 250 may be formed as a part of the memory 220 and/or may be used to access all or a portion of the memory 220. Additionally or alternatively, the storage module 250 may be used to store and retrieve data from persisted storage other than the persisted storage (if any) accessible via the memory 220. In some embodiments, the storage module 250 may be used to store and retrieve data in/from a database. A database may be stored in persisted storage. Additionally or alternatively, the storage module 250 may access data stored remotely such as, for example, as may be accessed using a local area network (LAN), wide area network (WAN), personal area network (PAN), and/or a storage area network (SAN). In some embodiments, the storage module 250 may access data stored remotely using the communications module 230. In some embodiments, the storage module 250 may be omitted and its function may be performed by the memory 220 and/or by the processor 210 in concert with the communications module 230 such as, for example, if data is stored remotely.

The remote device 102 or 104 may include or be connected to a display 260. The display 260 is a module of the remote device 102 or 104. The display 260 is for presenting graphics. The display 260 may be, for example, a liquid crystal display (LCD). In addition to being an output device, the display 260 may also be an input device. For example, the display 260 may allow touch input to be provided to the remote device 102 or 104. In other words, the display 260 may be a touch sensitive display module. In a particular example, the display 260 may be a capacitive touch screen.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
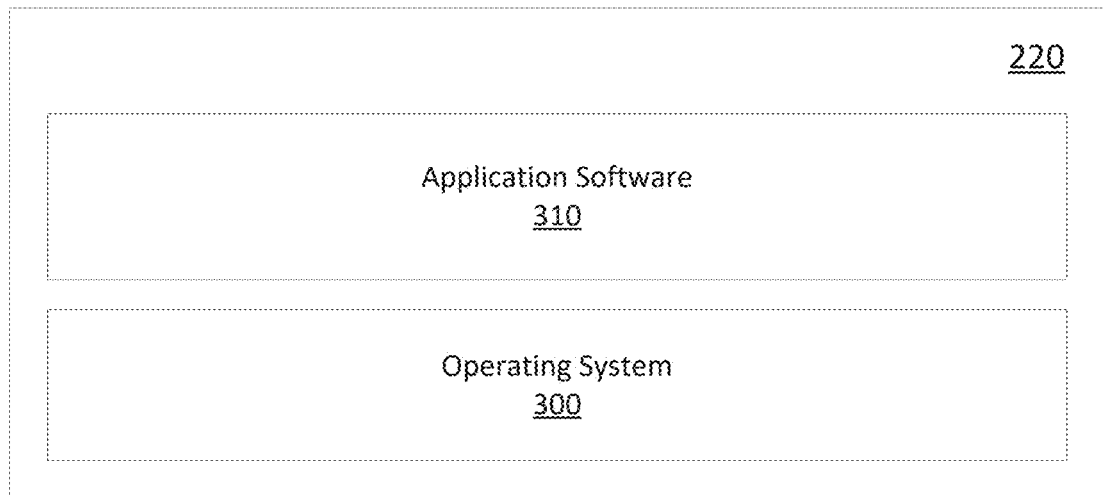
FIG. 3 shows a simplified organization of software components stored in a memory of the remote device of FIG. 2.

FIG. 3 depicts a simplified organization of software components stored in the memory 220 of the remote device 102 or 104. As illustrated, these software components include an operating system 300 and an application software 310.

The operating system 300 is software. The operating system 300 allows the application software 310 to access the processor 210 (FIG. 3), the memory 220, the communications module 230, the I/O module 240, and the storage module 250 of the remote device 100. The operating system 300 may be, for example, Google™ Android™, Apple™ iOS™, UNIX™, Linux™, Microsoft™ Windows™, Apple OSX™ or the like.

The application software 310 adapts the remote device 102 or 104, in combination with the operating system 300, to operate as a device for facilitating data transfers.

As noted above, the first system 106 and second system 108 are or include a computer system. An example computer system 400 will now be discussed with reference to FIGS. 4 and 5. Suitably-configured instances of the example computer system 400 may, in some embodiments, serve as and/or be a part of the first system 106 and/or second system 108.

Figure 4:
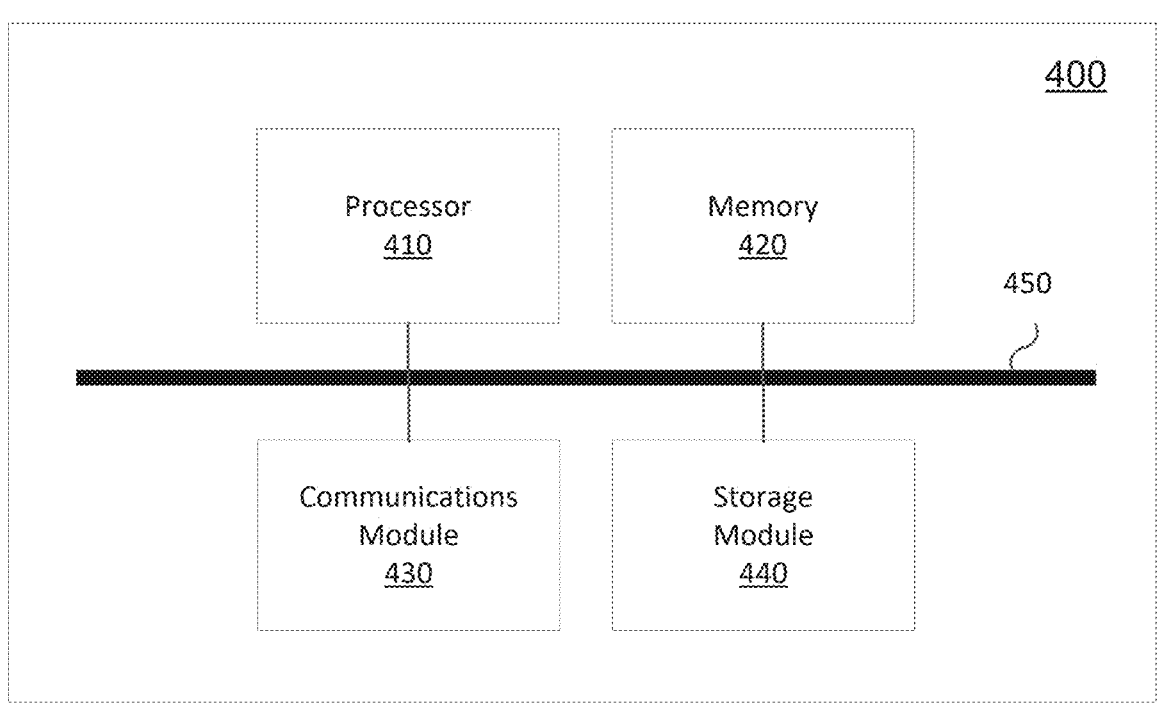
FIG. 4 shows a high-level schematic diagram of an example embodiment of the transferor and recipient computing systems of FIG. 1.

FIG. 4 is a high-level schematic diagram of an example computer system 400.

The example computer system 400 includes a variety of modules. For example, as illustrated, the example computer system 400 may include a processor 410, a memory 420, a communications module 430, and/or a storage module 440. As illustrated, the foregoing example modules of the example computer system 400 are in communication over a bus 450. As such, the bus 450 may be considered to couple the various modules of the example computer system 400 to each other, including, for example, to the processor 410.

The processor 410 is a hardware processor. The processor 410 may, for example, be one or more ARM, Intel x86, PowerPC processors or the like.

The memory 420 allows data to be stored and retrieved. The memory 420 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computer system 400.

The communications module 430 allows the example computer system 400 to communicate with other computing devices and/or various communications networks such as, for example, the network 110. The communications module 430 may allow the example computer system 400 to send or receive communications signals. Communications signals may be sent or received according to one or more protocols or according to one or more standards. For example, the communications module 430 may allow the example computer system 400 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE), 5G or the like. Additionally or alternatively, the communications module 430 may allow the example computer system 400 to communicate via Wi-Fi™, using Bluetooth™ or via some combination of one or more networks or protocols. In some embodiments, all or a portion of the communications module 430 may be integrated into a component of the example computer system 400. For example, the communications module may be integrated into a communications chipset.

The storage module 440 allows the example computer system 400 to store and retrieve data. In some embodiments, the storage module 440 may be formed as a part of the memory 420 and/or may be used to access all or a portion of the memory 420. Additionally or alternatively, the storage module 440 may be used to store and retrieve data from persisted storage other than the persisted storage (if any) accessible via the memory 420. In some embodiments, the storage module 440 may be used to store and retrieve data in a database. A database may be stored in persisted storage. Additionally or alternatively, the storage module 440 may access data stored remotely such as, for example, as may be accessed using a local area network (LAN), wide area network (WAN), personal area network (PAN), and/or a storage area network (SAN). In some embodiments, the storage module 440 may access data stored remotely using the communications module 430. In some embodiments, the storage module 440 may be omitted and its function may be performed by the memory 420 and/or by the processor 410 in concert with the communications module 430 such as, for example, if data is stored remotely.

Software comprising instructions is executed by the processor 410 from a computer-readable medium. For example, software may be loaded into random-access memory from persistent storage of the memory 420. Additionally or alternatively, instructions may be executed by the processor 410 directly from read-only memory of the memory 420.

Figure 5:
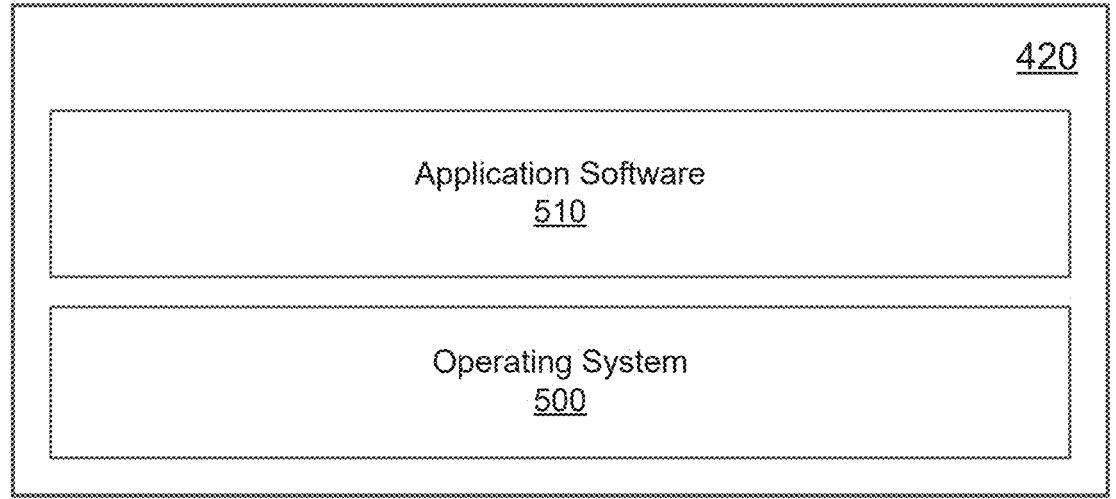
FIG. 5 shows a simplified organization of software components stored in the example computing systems of FIG. 4.

FIG. 5 depicts a simplified organization of software components stored in the memory 420 of the example computer system 400. As illustrated, these software components include an operating system 500 and an application software 510.

The operating system 500 is software. The operating system 500 allows the application software 510 to access the processor 410, the memory 420, the communications module 430, and the storage module 440 of the example computer system 400. The operating system 500 may be, for example, UNIX™, Linux™, Microsoft™ Windows™, Apple OSX™ or the like.

The application software 510, when executed, co-operates with the operating system 500 to adapt the example computer system 400 for some purpose and to provide some defined functionality. For example, the application software 510 may cooperate with the operating system 500 to adapt a suitable embodiment of the example computer system 400 to serve as the first system 106 and/or second system 108.

Figure 6:
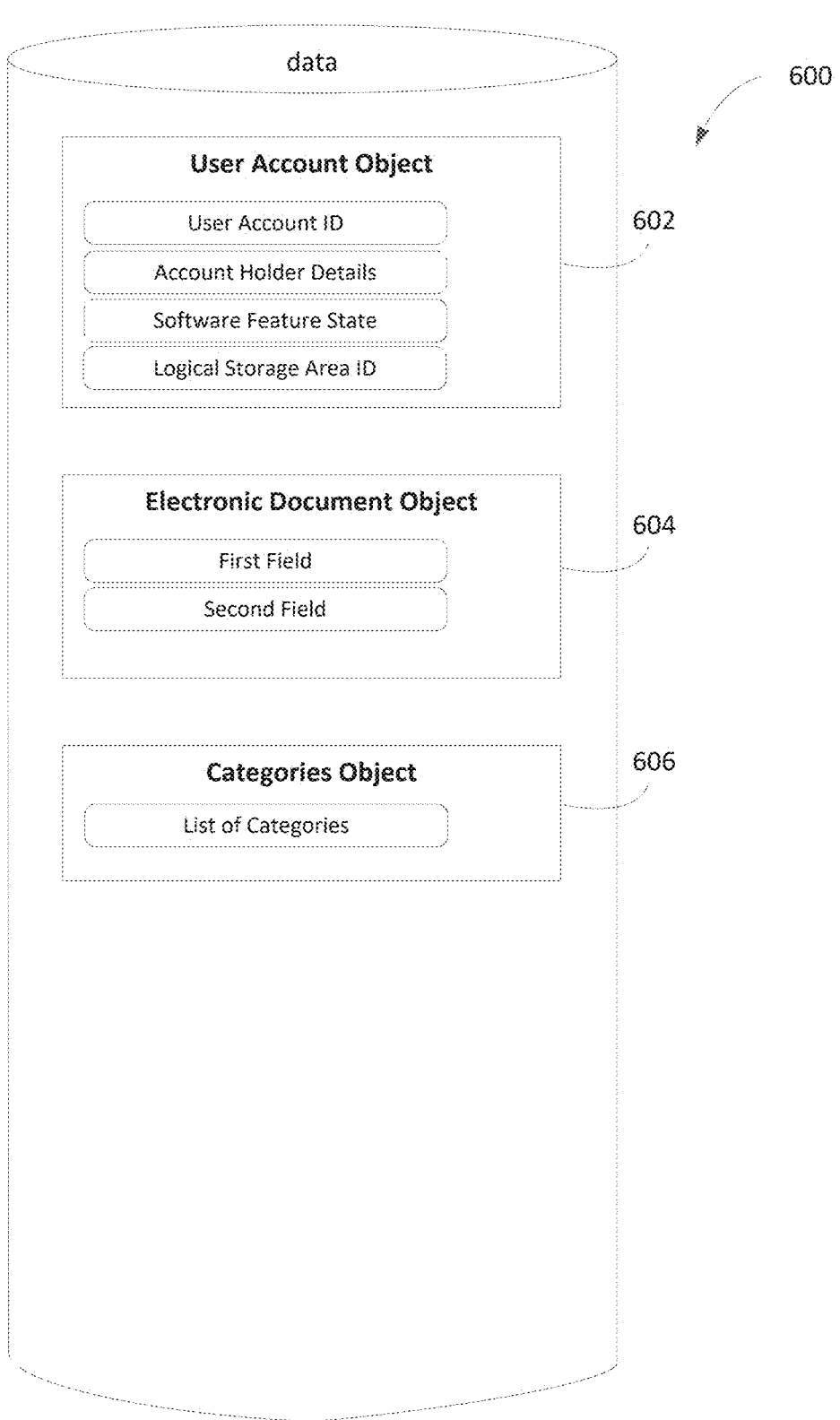
FIG. 6 shows, in block diagram form, an example embodiment of a data store of FIG. 1.

Reference is now made to FIG. 6, which partially illustrates an example data store 600 in block diagram form. The data store may be a data store 116 of the first system 106 of FIG. 1 and/or a data store 118 of the second system 108 of FIG. 1. Not all components of the data store 600 are illustrated. The data store 600 may include one or more data storage units. In some cases, the stored data may be in a database format and may include one or more databases. The databases may be relational databases in some examples. The data store may store data regarding one or more user account objects 602, electronic document objects 604, and categories objects 606. Each of the objects 602, 604 and 606 may be a data structure.

The data store 600 may store data regarding an account holder in a user account object 602. A user account object 602 may also include details regarding an individual or entity holding an account or other logical storage area. Example details include a user account identifier indicating a particular person or entity, identification information (e.g. first and last name), an alias (e.g. email address, phone number), contact information (e.g. home address), and sign in or authentication credentials (e.g. user name, password, access card number). In some embodiments, the account holder may be or represent a user, transferor, recipient, payor, payee, or customer.

A user account object 602 include the state of one or more software features associated with an account. The state may be, for example, "locked" or "unlocked".

A user account object 602 may be associated with a logical storage area. A logical storage area may be or include an area of the data store 600. A logical storage area may further be or represent a bank account or other logical storage area for storing a quantity of a resource. In some embodiments, the data store 600 may include a database of customer accounts and bank accounts at a particular financial institution.

A user account object 602 may also include one or more identifiers that may link to one or more respective logical storage areas. For example, a user account object 602 may include a logical storage area identifier indicating a logical storage area that is associated with an account holder.

The data store 600 may further store data regarding an electronic document in an electronic document object 604. The electronic document object 604 may be a data structure and may contain details or parameters regarding an electronic document. In some embodiments, the electronic document object 604 is an XML document.

Example parameters that may be included in an electronic document include an identifier identifying the particular electronic document and an identifier identifying a category.

In some embodiments, for example where the electronic document represents a transfer, the parameters may include: an amount of resources to be transferred; identification information of the first and/or second account holders (e.g. full name, postal address, contact details, telephone number, email address, alias); and routing data, which may include identification information of the first and/or second system and/or the entity associated with, operating or managing the first and/or second system (e.g. a routing number, financial institution identifier, and/or branch transit number associated with the first and/or second system) and/or identification information of a first and/or second logical storage area, for example, a logical storage area identifier (e.g. bank account number), associated with, managed or controlled by a respective first and/or second account holder to or from which the amount of resources is to be transferred. The parameters may be or include numeric and/or alphanumeric values.

The data store 600 may further store data regarding possible predefined categories in a categories object 606. The categories object 606 may include a plurality of defined operators that may be used by the first system 106 to provide a customized experience. In some embodiments, where the electronic document represents metadata included in a transfer message, the categories may represent types of transfer messages. For example, the plurality of defined categories may indicate at least one of the following categories: a data transfer, payment, request for payment, tax payment, income tax remittance, payroll payment, payment on account of goods received, or payment on account of services rendered category.

The first system 106 and second system 108 illustrated in FIG. 1 may store one or more user account objects 602, electronic document objects 604, and categories objects 606 in a data store 116 and/or 118.

Reference will now be made to FIG. 7 which illustrates an example method 700 for creating a score. The operations of the example method 700 may be performed by a computer system which may be of the type described herein. In some embodiments, the operations 702, 704, 706, 708 and 710 may be performed by a first system 106 and the operations 712, 714, 716 and 718 may be performed by a second system 108, which may be of the type described herein.

In operation 702, a first computing system provides a user interface to a remote device. The user interface may include one or more interface elements configured for receiving input of one or more parameters. For example, the user interface may include one or more interface elements that prompt an operator or user to input certain parameters associated with an electronic document. For example, the user interface may allow an operator or user to select one or more defined categories of a data item that is input. The user interface may constrain the categories of data that the electronic document may be populated with.

In operation 704, the first computing system receives a signal from the remote device. The signal may include user input indicating one or more parameters.

In operation 706, the first computing system populates one or more data fields in an electronic document with one or more of the received parameters. The one or more data fields may include a first data field and a second data field. In this way, the electronic document may include a first data item in a first field and a second data item in a second field, where the first data item and the second data item may each represent user input.

In operation 708, the first computing system associates the electronic document with an account. For example, in some embodiments, the first computing system may populate one or more fields of the electronic document with account information or an alias that may be associated with the account and used to obtain account information. The account information may correspond to an account associated with a second computing system. In some embodiments, the first computing system also associates the electronic document with an account associated with the first computing system and the electronic document indicates a transfer of a resource between the account associated with the first computing system and the account associated with the second computing system.

In operation 710, the first computing system transmits, to a second computing system, a signal including the electronic document. In some embodiments, the signal may include a transfer message and the electronic document may represent metadata associated with a transfer message.

In operation 712, the second computing system obtains the electronic document associated with an account. Obtaining the electronic document may include receiving the electronic document from the first system. The electronic document may be parsed to retrieve from the electronic document a first data item and a second data item.

In operation 714, the second computer system categorizes the first data item included in the electronic document based on the second data item included in the electronic document. For example second data item may match, indicate or otherwise correspond to a predefined category included in a categories object 606 the example data store 600 of FIG. 6. The first data item may be categorized according to the predefined category that matches, is indicated by, or corresponds to, the second data item.

In operation 716, the operations 702, 704, 706, 708, 710, 712 and 714 may be performed to categorize respective first data items included in a plurality of electronic documents associated with the account. In some embodiments, the operations 702, 704, 706, 708, 710, 712 and 714 may be carried out by a plurality of computing systems in communication with a plurality of remote devices. In this way, the plurality of computing systems, including the first computing system, may populate a plurality of electronic documents. Each particular electronic document in the plurality of electronic documents may include a respective first data item in a first field and a respective second data item in a second field. In addition, each particular computing system in the plurality of computing systems may transmit to the second computing system one or more respective electronic documents associated with the account.

In operation 718, the second computer system applies a scoring model to the respective first data items included in the plurality of electronic documents according to the categorizations to create a score.

The categorizations may include a plurality of categories and the scoring model may be applied to data items that fall within a plurality of categories. For example, one of the first data items may be categorized as an expense, whereas another of the first data items may be categorized as revenue, and the scoring model may generate a score using both of the first data items. In other words, the scoring model may combine data items that fall into different categories.

In some embodiments, applying a scoring model includes summing or totalling the respective first data items that fall within one or more predefined categories. For example, the second computing system may categorize each particular data item in the respective first data items as one of revenue or an expense. The score may be created by summing the first data items that are categorized as revenue, summing the first data items that are categorized as expenses, or calculating the difference between the summed revenue and the summed expenses. In this way, the score may be an indicator of expenses or revenues associated with an account. In some embodiments, the score may be an indicator of the financial health of an account or a holder of the account.

The score may be determined in response to obtaining, receiving or processing each particular electronic document in the plurality of electronic documents. In some embodiments, for example where each particular electronic document represents metadata included in a respective transfer message in a plurality of transfer messages, a respective score may be determined in response to processing and completing a respective transfer. Completing a respective transfer may include transferring an amount of a resource, represented by a respective first data item, to or from a logical storage area associated with the account.

In this way, the second computing system may constantly re-determine the score after completing each transfer. Put another way, the computing system may re-determine the score in response to completing each particular transfer in a plurality of transfers.

Reference will now be made to FIG. 8 which illustrates an example method 800 for adjusting a score. The operations of the example method 800 may be performed by a computer system which may be of the type described herein. In some embodiments, the operations of the method 800 may be performed by a first system 106 or second system 108, which may be of the type described herein.

One or more operations in the example method 800 described in the example method of FIG. 8 may be performed in real-time in response to receiving an additional electronic document that may be populated and transmitted to the computing system as described in operations 702, 704, 706, 708 and 710 of FIG. 7.

In operation 802, a computing system obtains an electronic document associated with an account. In some embodiments, the operation 802 may correspond to the operation 712 of FIG. 7.

In operation 804, in response to obtaining the electronic document, the computing system categorizes a first data item included in the electronic document based on a second data item included in the electronic document. In some embodiments, the operation 804 may correspond to the operation 714 of FIG. 7.

In operation 806, the computing system determines an adjusted score based on a prior score and the categorization of the first data item. For example, if the category of the first data item matches a particular predefined category, then the prior score may be adjusted to create the adjusted score. In some embodiments, the adjusted score may be calculated by adding or subtracting the first data item from the prior score. In some embodiments, the score is adjusted only if the category of the first data item matches a particular predefined category.

In some embodiments, the operations 802, 804 and 806 may be performed for a plurality of additional electronic documents and a plurality of respective adjusted scores may be determined.

Figure 9:
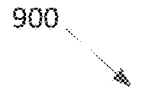
FIG. 9 is another flowchart showing operations performed in controlling access to software features, according to an example embodiment.

Reference will now be made to FIG. 9 which illustrates an example method 900 for controlling access to software features in a computing environment. The operations of the method 900 may be performed by a first system 106 or second system 108, which may be of the type described herein.

In operation 902, the computer system determines a score. In some embodiments, the operation 902 may correspond to the operation 718 in the method 700 of FIG. 7. In some embodiments, determining the score may include determining an adjusted score and the operation 902 may correspond to the operation 806 in the method 800 of FIG. 8.

In operation 904, the computer system determines a score trend. Determining the score trend may include comparing the score with one or more historical scores. In this way, the computer system may detect a deterioration in the score based on metadata included in a transfer message.

In operation 906, the computer system determines whether a condition is satisfied based on the score. In some embodiments, the condition may be that the score trend indicates no deterioration in the score.

The condition may include a comparison of the score with another value. In some embodiments, the condition may be satisfied if the score meets a threshold. The computer system may evaluate the condition based on a comparison between the score and one or more parameters associated with the account.

In some embodiments, the comparison may be between the score and data not included in the plurality of electronic documents. The comparison data that is not included in the plurality of electronic documents may be account data associated with the computer system. By way of another example, the condition may be evaluated based on one or more historical scores associated with the account, the score prior to adjustment, or an unadjusted score.

In operation 908, if the condition is satisfied, the computer system may determine whether a software feature associated with the account is already locked. The software feature may include one or more software applications or modules. In some cases, the software feature includes a software product or software upgrade.

In operation 910, if the condition is satisfied and the software is not already locked, the computer system unlocks the software feature. Unlocking a software feature may include enabling a software service or product associated with the account and/or providing access to a resource associated with the account. The resource may be, for example, in the form of a line of credit associated with the account or a loan or other amount associated with a lending product.

In some embodiments, unlocking a software feature includes configuring a parameter associated with the account. For example, a user account parameter representing the state of a software feature may be toggled from a locked state to an unlocked state. By way of another example, the parameter may increase or decrease a credit limit or increase or decrease a rate of interest associated with the account. In this way, the credit limit or rate may change frequently as the score changes.

In some embodiments, the software feature may remain unlocked until the condition is not satisfied based on a future score.

In some embodiments, the computer system unlocks the software feature for a defined unlock time period and upon the expiry of the defined unlock time period may automatically and immediately revert back to the locked state. The defined unlock time period may, for example, be three months, six months or a year. In some embodiments, the software feature is unlocked up to a defined unlock expiry date, which may include a time, and when the defined unlock expiry date passes the software feature may automatically and immediately revert back to the locked state.

In some embodiments, the computer system unlock the software feature once a defined lock time period expires or a defined lock expiry date passes. In some embodiments, the software feature may be unlocked prematurely. For example, the software feature may be unlocked immediately irrespective of whether a defined lock time period or defined lock expiry date is associated with the software feature and/or the defined lock time period has not passed or the defined lock expiry date has not expired.

In operation 912, if the condition is satisfied and the software is already locked, the computer system may renew access to the software feature. In some embodiments, renewing the access to the software feature may include extending the defined unlock time period or extending the defined expiry date. In some embodiments, the defined unlock time period is doubled, for example, from three months to six months.

In operation 914, if the condition is satisfied, the computer system may determine whether a software feature associated with the account is already locked. The operation 914 may correspond to the operation 908 of FIG. 9.

In operation 916, if the condition is not satisfied and the software feature is not already locked, the computer system locks the software feature. Unlocking a software feature may include disabling a software service or product associated with the account, providing access to a resource associated with the account, and/or configuring a parameter associated with the account. The operation 916 may reverse the unlock operation 910 of FIG. 9 in whole or in part.

In some embodiments, the software feature may remain locked until the condition is not satisfied based on a future score.

In some embodiments, the computer system locks the software feature for a defined lock time period and upon the expiry of the defined lock time period may automatically and immediately revert back to the unlocked state. The defined lock time period may, for example, be three months, six months or a year. In some embodiments, the software feature is locked up to a defined lock expiry date, which may include a time, and when the defined lock expiry date passes the software feature may automatically and immediately revert back to the unlocked state.

In some embodiments, the computer system locks the software feature once the defined unlock time period expires or the defined unlock expiry date passes. In some embodiments, the software feature may be locked prematurely. For example, the software feature may be locked immediately irrespective of whether a defined unlock time period or defined unlock expiry date is associated with the software feature and/or the defined unlock time period has not passed or the defined unlock expiry date has not expired.

In operation 918, if the condition is not satisfied and the software is already locked, the computer system may renew the lock on the software feature. In some embodiments, renewing the lock to the software feature may include extending the defined unlock time period or extending the defined expiry date. In some embodiments, the defined unlock time period is doubled, for example, from three months to six months.

In this way, if the software feature is already unlocked, the computer system may leave the software feature unlocked in response to determining that the condition is satisfied. Otherwise, if the condition is not satisfied, the computer system in operation locks the software feature. Put another way, the status of the software feature may be toggled between a locked state and an unlocked state.

In operation 920, the computer system generates a notification indicating the score, one or more parameters associated with the account, and the status of the software feature, such as an indication that the software the software feature is locked or unlocked, an indication of whether the lock or unlock has been renewed, an indication of a time period or expiry date associated with the software feature, and/or an indication of whether the lock or unlock operation has occurred prematurely.

The computer system may transmit the notification to a remote device associated with an alias associated with the account and present the notification to a user of the remote device via a user interface. The user interface may be that of a messaging application, such as an email application, text and/or voice message application, or instant message application. In some embodiments, the user interface may be a graphical user interface that presents the notification via pop-up, alert, or in any other suitable manner.

It will be appreciated that it may be that some or all of the above-described operations of the various above-described example methods may be performed in orders other than those illustrated and/or may be performed concurrently without varying the overall operation of those methods.

Although many of the above examples refer to an "object" when discussing a data structure, it will be appreciated that this does not necessarily restrict the present application to implementation using object-oriented programming languages, and does not necessarily imply that the data structure is of a particular type or format. Data structures may have different names in different software paradigms.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a communications module;
   a processor coupled to the communications module; and
   a memory coupled to the processor storing instructions that, when executed by the computer system, cause the computer system to:
   complete a plurality of resource transfers of a respective amount of a resource to or from a logical storage area associated with an account, each particular resource transfer in the plurality of resource transfers corresponding to a respective ISO 20022 message requesting transfer of the respective amount of the resource to or from the logical storage area;
   for each particular completed resource transfer in the plurality of completed resource transfers, categorize a respective first data item included in an ISO 20022 format in the respective corresponding ISO 20022 message based on a respective second data item included in the ISO 20022 format in the respective corresponding ISO 20022 message;
   apply a scoring model to the respective first data items included in the respective ISO 20022 messages according to the categorizations to create a score; and
   unlock a loan software feature associated with the account in response to determining that the score meets a threshold; and
   after unlocking the loan software feature, in real-time in response to a completion of an additional transfer of a resource requested in an additional ISO 20022 message and a determination that a category of a data item included in an ISO 20022 format in the additional ISO 20022 message matches a predefined category:
      determine an adjusted score trend based on the data item included in the ISO 20022 format in the additional ISO 20022 message; and automatically relock, based on the score trend determined by comparing the adjusted score with one or more historical scores, the unlocked loan software feature.

2. The system of claim 1, wherein unlocking the loan software feature includes enabling a software service or product associated with the account.

3. The system of claim 1, wherein unlocking the loan software feature includes providing access to a resource associated with the account.

4. The system of claim 1, wherein unlocking the loan software feature includes configuring a parameter associated with the account.

5. The system of claim 1, wherein the instructions further cause the computer system to detect a deterioration in the score based on metadata included in a plurality of additional transfer messages.

6. The system of claim 1, wherein the categorizations include a plurality of categories.

7. The system of claim 1, wherein the categorizations represent types of transfer messages.

8. The system of claim 1, wherein each respective first data item represents an amount of resources to be transferred.

9. The system of claim 1, wherein the respective first data items include a numeric value.

10. The system of claim 1, wherein the instructions further cause the computer system to automatically lock the unlocked loan software feature associated with the account in response to determining that the adjusted score does not meet the threshold.

11. The system of claim 1, wherein the instructions further cause the computer system to leave the loan software feature unlocked in response to determining that the adjusted score meets the threshold.

12. The system of claim 1, wherein the instructions further cause the computer system to categorize a third data item included in the additional ISO 20022 message and determine the adjusted score in response to determining that the categorization of the third data item matches a defined category.

13. The system of claim 1, wherein the plurality of ISO 20022-formatted resource transfer request messages and the additional ISO 20022-formatted resource transfer request message are requests to transfer.

14. The system of claim 1, wherein the instructions further cause the computer system to:
   determine that the loan software feature is already locked; and
   in response determining that the loan software feature is already locked, renew the lock on the software feature by extending a defined locktime period.

15. The system of claim 1, wherein the loan software feature is a software application, software module, or software product.

16. The system of claim 1, wherein the score trend is redetermined after completing each particular resource transfer in the plurality of resource transfers.

17. A method for controlling access to a loan software feature in a computing environment, the method comprising:
   completing a plurality of resource transfers of a respective amount of a resource to or from a logical storage area associated with an account, each particular resource transfer in the plurality of resource transfers corresponding to a respective ISO 20022 message requesting transfer of the respective amount of the resource to or from the logical storage area;

for each particular completed resource transfer in the plurality of completed resource transfers, categorizing a respective first data item included in an ISO 20022 format in the respective corresponding ISO 20022 message based on a respective second data item included in the ISO 20022 format in the respective corresponding ISO 20022 message;
   applying a scoring model to the respective first data items included in the respective ISO 20022 messages according to the categorizations to create a score; and
   unlocking a loan software feature associated with the account in response to determining that the score meets a threshold; and
   after unlocking the loan software feature, in real-time in response to a completion of an additional transfer of a resource requested in an additional ISO 20022 message and a determination that a category of a data item included in an ISO 20022 format in the additional ISO 20022 message matches a predefined category:
      determining an adjusted score based on the data item included in the ISO 20022 format in the additional ISO 20022 message; and
      determining a score trend by comparing the adjusted score with one or more historical scores;
   automatically relocking, based on the score trend determined by comparing the adjusted score with one or more historical scores, the unlocked loan software feature.

18. The method of claim 17, wherein unlocking the loan software feature includes enabling a software service or product associated with the account.

19. The method of claim 17, wherein each respective first data item represents an amount of resources to be transferred.

20. A non-transitory computer-readable storage medium comprising processor-executable instructions which, when executed, configure a processor to:
   complete a plurality of resource transfers of a respective amount of a resource to or from a logical storage area associated with an account, each particular resource transfer in the plurality of resource transfers corresponding to a respective ISO 20022 message requesting transfer of the respective amount of the resource to or from the logical storage area;
   for each particular completed resource transfer in the plurality of completed resource transfers, categorize a respective first data item included in an ISO 20022 format in the respective corresponding ISO 20022 message based on a respective second data item included in the ISO 20022 format in the respective corresponding ISO 20022 message;
   apply a scoring model to the respective first data items included in the respective ISO 20022 messages according to the categorizations to create a score; and
   unlock a loan software feature associated with the account in response to determining that the score meets a threshold; and
   after unlocking the loan software feature, in real-time in response to a completion of an additional transfer of an additional amount of the resource requested in an additional ISO 20022 message and a determination that a category of a data item included in an ISO 20022 format in the additional ISO 20022 message matches a predefined category:
      determine an adjusted score based on the data item included in the ISO 20022 format in the additional ISO 20022 message; and determine a score trend by comparing the adjusted score with one or more historical scores;

automatically relock, based on the score trend determined by comparing the adjusted score with one or more historical scores, the unlocked loan software feature.

* * * * *